(12) United States Patent
Lucas et al.

(10) Patent No.: US 9,752,631 B2
(45) Date of Patent: Sep. 5, 2017

(54) MECHANISM, USE AND METHOD FOR CONTROLLING A ROTARY PLATE OF A CAROUSEL, AND MERRY-GO-ROUND COMPRISING SUCH A CAROUSEL

(71) Applicants: Frederic Lucas, Toulouse (FR); Victor Lucas, Toulouse (FR)

(72) Inventors: Frederic Lucas, Toulouse (FR); Victor Lucas, Toulouse (FR)

( * ) Notice: Subject to any disclaimer, the term of this patent is extended or adjusted under 35 U.S.C. 154(b) by 0 days.

(21) Appl. No.: 15/120,178

(22) PCT Filed: Feb. 17, 2015

(86) PCT No.: PCT/FR2015/050381
§ 371 (c)(1),
(2) Date: Aug. 19, 2016

(87) PCT Pub. No.: WO2015/124859
PCT Pub. Date: Aug. 27, 2015

(65) Prior Publication Data
US 2017/0058974 A1 Mar. 2, 2017

(30) Foreign Application Priority Data
Feb. 21, 2014 (FR) ...................................... 14 51384

(51) Int. Cl.
*A63B 22/14* (2006.01)
*A63G 1/10* (2006.01)
(Continued)

(52) U.S. Cl.
CPC .............. *F16D 51/12* (2013.01); *A63G 1/10* (2013.01); *B60T 1/005* (2013.01); *B60T 1/062* (2013.01);
(Continued)

(58) Field of Classification Search
CPC ......... A63B 22/00; A63B 22/14; A63B 22/16; A63B 22/18; A63G 1/00; A63G 1/10; A63G 1/12
(Continued)

(56) References Cited

U.S. PATENT DOCUMENTS

| 1,844,818 A | 2/1932 | Gattie |
| 4,811,942 A * | 3/1989 | Rusk ........................ A63G 1/12 188/272 |

(Continued)

FOREIGN PATENT DOCUMENTS

GB 1201146 8/1970

*Primary Examiner* — Kien Nguyen
(74) *Attorney, Agent, or Firm* — Steven M. Greenberg, Esq.; CRGO Law

(57) ABSTRACT

The invention relates to a carousel that is supported by a rotary plate controlled by a control mechanism (20). The mechanism (20) comprises:

Figure 1:
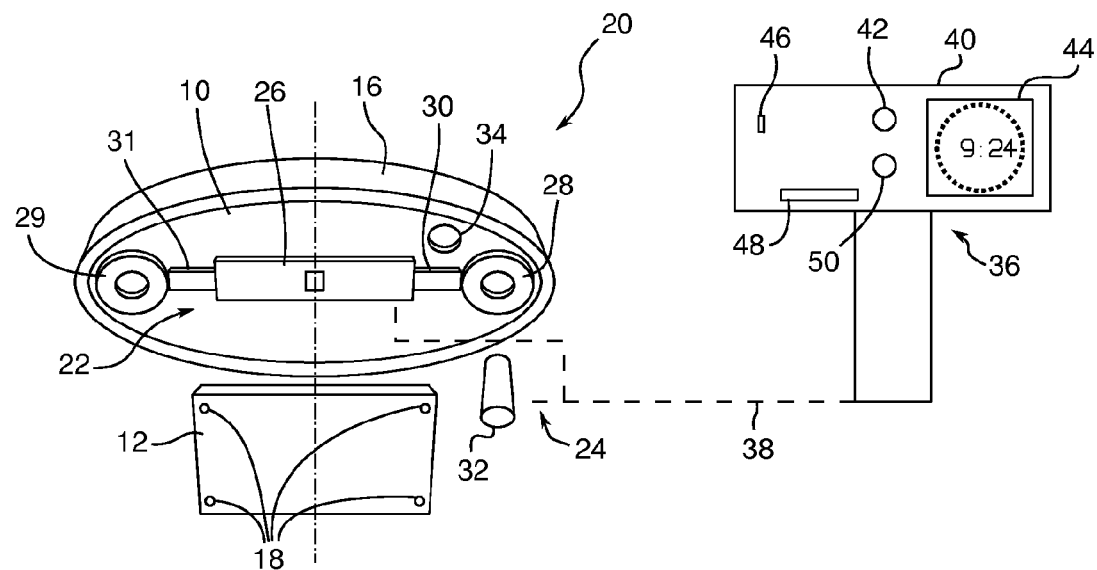

means for restraining said rotary plate (10) which are controlled in two states, a restrained state and a released state, said means being suitable for providing, in said restrained state, a rotational restraint of said rotary plate (10), and for allowing, in said released state, a free rotation of said rotary plate (10), and a device (36) for controlling said restraint means that is suitable for driving, on command, said restraint means into said released state, said restraint means being in the restrained state by default.

9 Claims, 2 Drawing Sheets

(51) Int. Cl.
*F16D 51/12* (2006.01)
*B60T 1/00* (2006.01)
*B60T 1/06* (2006.01)
*F16D 51/20* (2006.01)
*F16D 63/00* (2006.01)
*F16D 65/08* (2006.01)
*F16D 65/22* (2006.01)
*F16D 71/00* (2006.01)
*G07F 17/32* (2006.01)

(52) U.S. Cl.
CPC ........... *F16D 51/20* (2013.01); *F16D 63/006* (2013.01); *F16D 65/08* (2013.01); *F16D 65/22* (2013.01); *F16D 71/00* (2013.01); *G07F 17/32* (2013.01)

(58) Field of Classification Search
USPC .................................. 472/29, 30, 33, 35, 40
See application file for complete search history.

(56) References Cited

U.S. PATENT DOCUMENTS 5,616,104 A * 4/1997 Mulenburg ........ A63B 21/0054
472/21
5,740,891 A 4/1998 Song

* cited by examiner

MECHANISM, USE AND METHOD FOR CONTROLLING A ROTARY PLATE OF A CAROUSEL, AND MERRY-GO-ROUND COMPRISING SUCH A CAROUSEL

CROSS-REFERENCE TO RELATED APPLICATIONS

This application is a §371 national phase entry of International Application No. PCT/FR2015/050381, filed Feb. 17, 2015, which claims priority to French Patent Application No. 1451384, filed Feb. 21, 2014.

1. TECHNICAL FIELD OF THE INVENTION

The present invention relates to a carousel that is supported by a rotary plate controlled by a control mechanism, to a method for controlling a rotary plate, and to a use of a mechanism for controlling the carousel.

2. TECHNOLOGICAL BACKGROUND

A rotary plate makes it possible to support an element that is intended to be able to rotate. Such a rotary plate makes it possible for example to support a carousel so that its rotation can entertain persons on the carousel, for example on wooden horses in the most usual variants.

Conventionally, a carousel is rotated by a motor that is configured to drive the rotary plate supporting the rotating carousel. The use of such a motor is particularly necessary for large carousels. The rotation of the plate, and therefore of the carousel, depends on the operating speed of the motor, which makes it possible to control the speed of said rotation.

For smaller carousels, and therefore smaller rotary plates, it can be envisaged to not use a motor for the rotation: said rotation is therefore free and can be initiated manually, either by a person present on the carousel or by a person located outside it.

It is then possible to install a small carousel of this kind in an open place, such as a park or a square, and to leave it available to users without requiring the presence of a person responsible for managing the motor, as is the case with a larger carousel.

Nevertheless, leaving such a carousel without a motor available to users may pose certain problems, in particular if this carousel is located in a public place:
  safety problems related to the use of the carousel without management personnel, in particular for children who should not use the carousel without supervision,
  availability problems related to the lack of restriction of use, which may give rise to improper behaviour such as prolonged use.

Thus, the rotation of the rotary plate must be controlled in order to satisfy all these requirements relating to the use of the carousel.

3. AIMS OF THE INVENTION

The invention aims to overcome at least some of the drawbacks of known rotary plates, in particular those intended to support a carousel.

In particular, the invention aims to provide, in at least one embodiment of the invention, a mechanism for controlling the rotation of a freely rotating rotary plate supporting a carousel.

The invention also aims to provide, in at least one embodiment of the invention, a method for controlling the rotation of a freely rotating rotary plate.

The invention also aims to provide, in at least one embodiment of the invention, a carousel supported by a freely rotating rotary plate.

The invention also aims to provide, in at least one embodiment of the invention, a use of a mechanism for controlling the rotation of a freely rotating rotary plate.

4. DISCLOSURE OF THE INVENTION

In order to achieve this, the invention relates to a carousel supported by a rotary plate, characterised in that said rotary plate is controlled by a control mechanism comprising:
  means for restraining said rotary plate that are controlled in two states, a restrained state and a released state, said means being suitable for providing, in said restrained state, a rotational restraint of said rotary plate, and for allowing, in said released state, a free rotation of said rotary plate, and
  a device for controlling said restraint means which is suitable for driving said restraint means on command into said released state, said restraint means being in the restrained state by default.

Free rotation means a rotation that is limited only by the mechanical connection that allows the plate to rotate, that is to say that is not subject to restraints external to this connection. Said mechanical connection is any mechanical connection known to a person skilled in the art that allows rotation of the rotary plate.

Restraint means any external action that prevents free rotation of the plate. This ranges from a simple slowing of the rotation of the plate or a limitation of its maximum rotational speed, to a total locking of the rotation.

The mechanism allows control of the rotary plate and the rotation thereof: the mechanism makes it possible to restrain the rotary plate so that its rotation is not free in its idle state, and to release this plate on command.

The control device is advantageously located at a distance from the rotary plate in order to allow control by an external person able to ensure safety in the case of danger on the rotary plate by switching the restraint means into the state most suited to the situation. Said external person thus does not directly interact with the rotary plate: this makes it possible to separate the place where the restraint means are controlled and the place where the control of the restraint means takes effect.

The control mechanism allows the use of the carousel to be restricted by the effect of a rotational restraint, or allows this restriction to be lifted (that is to say released) to allow use of the carousel. If the carousel is in a public place, this makes it possible to control the use of the carousel by preventing free rotation thereof in the absence of a release command. The control device allows an external person, advantageously located at a distance from the carousel, to ensure safety of the users present on the carousel, optionally by switching the restraint means into the released state or into the restrained state if the situation so requires.

The fact that the mechanism is separate from the plate and from the carousel allows the use of a carousel that does not have any element connected to an electrical network, in order to improve safety during use thereof. Thus, the users present on board the carousel can use it without risk of being in contact with electrical equipment that may prove to be dangerous in the event of malfunctioning of the electrical network, such as short-circuiting, wear such as bared or cut cables, etc.

Preferably, the carousel has a diameter of less than three meters. Thus, the carousel has a small diameter and therefore a low weight compared with large carousels driven by a motor, so that the carousel according the invention can easily be rotated solely by the manual force of a user of the carousel or a person located close by.

The invention may be used for other applications, and preferably for other recreational applications such as for example a whirligig.

Advantageously and according to the invention, said means for restraining the rotary plate comprise means for braking the rotation of the rotary plate.

According to this aspect of the invention, the braking means allow the mechanism to slow its rotational speed or to limit the maximum rotational speed. This makes it possible to prevent the rotary plate from being able to freely rotate without completely preventing the rotation thereof.

The braking means allow reduction in the rotational speed of the carousel so as not to create a danger by abruptly interrupting the rotation thereof, which could cause falls or impacts for a person located on board. Likewise, sufficiently strong braking may restrain the rotation of the carousel so that it is not possible to easily rotate it manually, thus preventing its recreational use without completely locking the rotation.

Advantageously, and according to this last aspect of the invention, said rotary plate being a circular rotary plate surrounded by a ring that is rigidly connected to and projects from said plate, is characterised in that said braking means comprise a device for moving braking wheels suitable for being moved between a deployed position in which they press on the ring so as to prevent free rotation of the plate, and a retracted position in which they are separated from the ring so as not to restrain the free rotation of the plate.

Advantageously and according to this aspect of the invention, the movement device is a straight jack device placed under the plate in its diameter and able to move said braking wheels between the retracted position and the deployed position.

According to other variants of the invention, the braking means are in the following form:
- a jaw placed level with a ring that is rigidly connected to and projects from the rotary plate, said jaw being suitable for gripping said ring so as to prevent free rotation of the plate, or
- a jaw around a rotary shaft of the rotary plate suitable for gripping said shaft so as to prevent free rotation of the plate, or
- a disc located under the rotary plate suitable for being pressed against said plate so as to prevent free rotation of the plate, or
- a device for electromagnetic braking that is placed under the rotary plate and interacts with magnetic elements placed on said plate so as to prevent free rotation of the plate,
- or a combination of these braking means.

Advantageously and according to the invention, said means for restraining the rotary plate comprise means for locking the rotary plate in rotation.

According to this aspect of the invention, the locking means completely prevent any rotation of the rotary plate.

The locking means prevent any attempt to rotate the carousel manually.

Advantageously and according to this last aspect of the invention, the locking means comprise a rod extending in a direction perpendicular to the plate and suitable for being inserted in an opening that is shaped to this rod and is provided on the rotary plate so as to lock the rotation of said rotary plate when the mechanism is in the restrained state.

The rod can be moved between a deployed position in which it is inserted in the opening, and a retracted position in which it is not inserted in said opening.

According to other variants of the invention, the locking means are in the following form:
- a rod extending in a direction parallel to the plate and suitable for being inserted in an opening provided on a ring that is rigidly connected to and projects from said plate, so as to lock the rotation of the rotary plate when the mechanism is in the restrained state, or
- a rod extending in a direction perpendicular to the plate, at the end of which rod there is an electromagnet, and which rod is suitable for coming into contact with a circular magnetic strip fixed to the underside of the rotary plate so as to lock the rotation of said rotary plate when the mechanism is in the restrained state,
- or a combination of these locking means.

Advantageously and according to the invention, the control device comprises a man-machine interface suitable for triggering a command for moving said restraint means into said released state.

According to this aspect of the invention, the command releasing the rotary plate comes from a user interacting with the man-machine interface.

The man-machine interface allows a user to control the release of the carousel to permit use thereof, either by the user himself or for someone else, for example a parent releasing the rotation of the carousel so that a child can use it.

Advantageously and according to this last aspect of the invention, the man-machine interface comprises a payment device, said payment triggering said command.

Payment device means any equipment for checking that a payment has been made allowing release of the rotary plate, whether this be a direct payment (coin machine, terminal for bank card, contactless payment terminal, etc.) or indirect payment (terminal for a token or ticket purchased from a vendor, terminal for checking subscription card or badge, secret code supplied after payment, etc.). The payment may also consist in inserting a card of the loyalty card type distributed for commercial or promotional purposes and loaded with use credit.

According to this aspect of the invention, the payment makes it possible to unlock the plate and to allow its free rotation.

The payment device makes it possible to better manage the use and availability of the carousel by restricting the use. It is thus possible to ensure that the users pay for the right to use the carousel in order to release the rotation thereof. This also makes it possible to improve safety in the case of use by children, a responsible person being required to make the payment and thus trigger the release of the carousel.

Advantageously and according to the invention, the control device comprises a timing means having a predefined duration and the control device is suitable for driving the restraint means into said released state during the timing period.

According to this aspect of the invention, the free rotation of the rotary plate is possible only for the duration of this timing, which makes it possible to temporally restrict normal use of the rotary plate.

The timing allows restriction of the use of a carousel for a predefined time period in order to allow better availability of the carousel for each user.

Advantageously and according to the invention, the triggering of the timing is commanded by the man-machine interface.

Advantageously and according to the invention, the triggering of the timing is commanded by the payment device of the man-machine interface.

Advantageously and according to the invention, the duration of the timing is proportional to the amount paid at the payment terminal.

According to another variant of the invention in which the control device comprises a man-machine interface, the control device is suitable for driving the restraint means into said released state as long as the user acts on the man-machine interface, for example by continuously pressing a button or by inserting a card, the command being sent as long as the card is present and removal of said card causing the end of the sending of the command.

When the man-machine interface comprises a payment device, said payment is for example made at the end of the sending of the command, according to the time during which this command has been sent.

Advantageously and according to the invention, the carousel is supported by a rotary plate controlled by a control mechanism, said control mechanism being characterised in that it comprises:
- means for restraining said rotary plate which are controlled in two states, a restrained state and a released state, said means being suitable for providing, in said restrained state, a rotational restraint of said rotary plate, and for allowing, in said released state, a free rotation of said rotary plate, and
- a device for controlling said restraint means that is suitable for driving said restraint means, on command, into said released state, said restraint means being in the restrained state by default.

The invention also relates to a merry-go-round comprising a carousel, a rotary plate and a control mechanism according to any of the preceding claims.

The invention also relates to a method for controlling a rotary plate, characterised in that it comprises:
- a step of restraining the free rotation of the rotary plate,
- a step of commanding the release of the restraint, during which the rotary plate rotates freely.

Advantageously, the method according to the invention is implemented by the device according to the invention.

Advantageously, the device according to the invention implements the method according to the invention.

The invention also relates to a use of a control mechanism according to the invention, characterised in that:
- the rotary plate is released by commanding the restraint means into the released state,
- the timing is triggered,
- at the end of the timing period, the rotation of said rotary plate is braked using the braking means until the rotation of said plate stops,
- when the rotation of said plate stops, said plate is locked in rotation by the locking means.

This use of the mechanism makes it possible to reduce the rotational speed of the plate by using the braking means at the end of the timing period and then, once the rotation of the plate has stopped, to lock the rotation thereof so that it can no longer be rotated until the plate is released again.

The end of the rotation of the plate can for example be determined by a speed sensor arranged on the rotary plate and connected to the control device.

This use is in particular suited to the case where the rotary plate supports a carousel, by first of all allowing deceleration of the rotary plate in order to ensure safety of the users of the carousel by preventing the rotation from being stopped abruptly, and then locking of the carousel so that it can no longer be used by a user as long as the plate is not once again released.

The invention also relates to a carousel, a merry-go-round, a method and a use, characterised in combination by all or some of the features mentioned above or below.

5. LIST OF FIGURES

Figure 2:
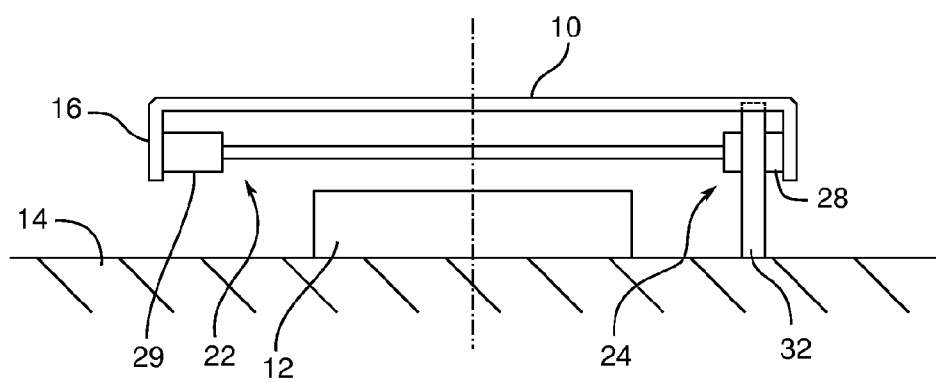
Figure 3:
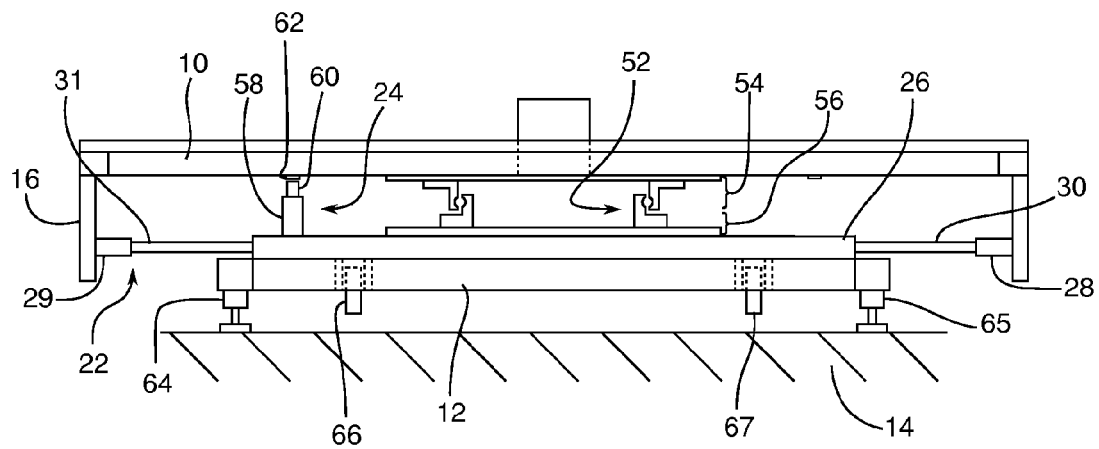
Figure 4:
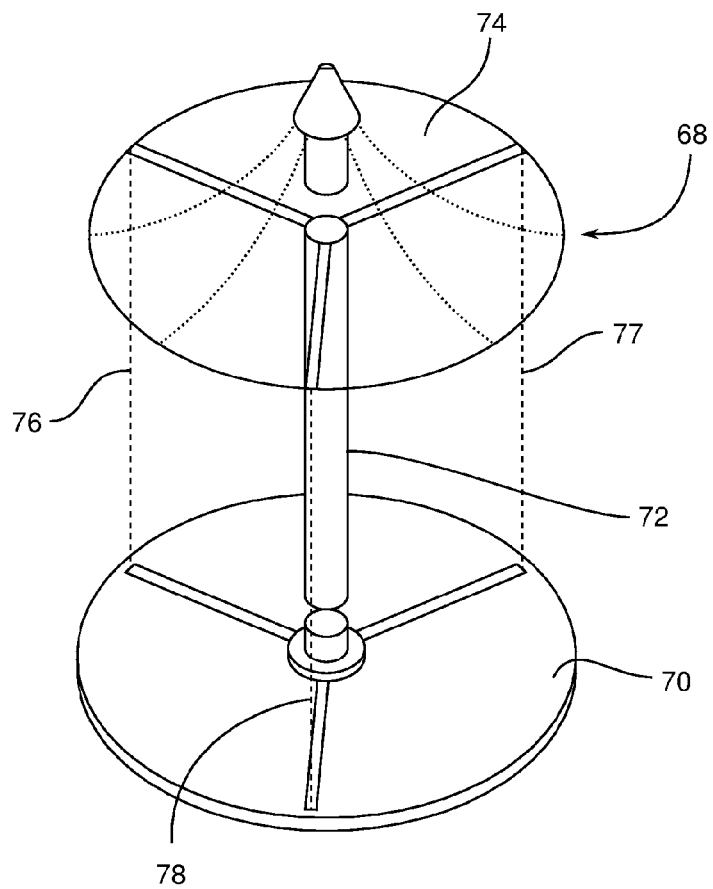

Other aims, features and advantages of the invention will emerge from reading the following description given by way of non-limiting example and with reference to the accompanying figures, in which:

FIG. 1 is schematic exploded perspective view of a rotary plate controlled by a control mechanism according to an embodiment of the invention, FIG. 2 is a schematic view of a cross section of the rotary plate controlled by a control mechanism according to an embodiment of the invention, FIG. 3 is a detailed view of a cross section of the rotary plate controlled by a control mechanism according to an embodiment of the invention, FIG. 4 is a schematic view of a carousel according to an embodiment of the invention.

6. DETAILED DESCRIPTION OF AN EMBODIMENT OF THE INVENTION

The following embodiments are examples. Although the description refers to one or more embodiments, this does not necessarily mean that each reference relates to the same embodiment, or that the features apply only to one embodiment. Single features of various embodiments may also be combined in order to provide other embodiments.

FIG. 1 is an exploded perspective view a rotary plate 10 that is intended to be arranged on a frame 12 that is placed on the ground 14 and produces the mechanical connection to the rotary plate so that said plate can rotate. The rotary plate shown comprises a ring 16 that is rigidly connected to the plate 10 and extends to as to project towards the ground 14. The ring 16 makes it possible in particular to conceal the space located below the rotary plate 10, for both safety and aesthetic reasons.

The plate 10 is generally formed of wooden slats on its top part, the slats being supported by a framework and a metal ring. The plate 10 is connected via the framework to the frame 12 by a mechanical connection of the pivot connection type.

The frame 12 comprises means for holding on the ground, either permanent if the plate 10 does not have to be moved, or temporary if the plate 10 can be moved; the permanent means for holding on the ground are for example metal feet provided with openings through which means for fixing to the ground are passed; the temporary means for holding on the ground are for example metal feet mounted on jacks that can be adjusted according to the surface of the ground on which the frame is located. The frame 12 is generally heavy, so as to keep a sufficiently low centre of gravity when the plate 10 supports a large element such as a carousel. A more detailed view of the frame 12 and of the plate 10 is described below with reference to FIG. 3.

The rotary plate 10 is controlled by a control mechanism 20 according to an embodiment of the invention which makes it possible to restrain or release the rotation of the rotary plate 10 according to the configuration of the various elements that make it up. This restraint and release are carried out by restraint means that the mechanism 20 comprises.

The restraint means according to this embodiment comprise braking means 22 and locking means 24. The braking means 22 consist of a straight jack device 26 that is placed on the frame 12 and in a diameter of the plate 10 and the ends of which are provided with braking wheels 28, for example made from rubber. These braking wheels 28 may be moved by the action of the device 26 between two positions: a deployed position in which the braking wheels 28 press on the ring 16 so as to prevent free rotation of the plate 10, and a retracted position in which the braking wheels 28 are separated from the ring 16 so as not to restrain the free rotation of the plate 10. The transition between the deployed position and the retracted position takes place by means of the movement of the jack cylinders 30. In the remainder of the description, similar use will be made of the terms braking means 24 in the deployed position when the braking wheels 28 are in the deployed position and braking means 22 in the retracted position when the braking wheels 28 are in the retracted position.

The locking means 24 according to this embodiment comprise a locking rod 32 extending in a direction perpendicular to the plate 10. This rod 32 is controlled so as to lock the rotation of the rotary plate 10 by being inserted in an opening 34 that is shaped to the rod 32 and provided on the rotary plate 10. The rod 32 is said to be in a deployed position when it is inserted in the opening 34 and in a retracted position when it is not inserted in the opening 34.

The restraint means are shown in this FIG. 1 in a released state, that is to say a state allowing free rotation of the rotary plate 10: the braking means 22 and the locking means 24 are in the retracted position, that is to say not preventing the rotation of the rotary plate 10.

The control mechanism 20 also comprises a control device 36 making it possible to change the state of the restraint means by a command 38. By default, the restraint means are in the restrained state, that is to say they provide a rotational restraint of the rotary plate 10. To allow free rotation of the rotary plate 10, the control device 36 sends a command 38 to the restraint means in order to drive them into the released state, in which they remove any rotational restraint of the rotary plate 10. The control device is located at a distance from the rotary plate so as to allow a user to control the plate without directly interacting therewith.

In this embodiment of the invention, the control device 36 comprises a man-machine interface 40, shown here on the control device 36. The man-machine interface 36 comprises in particular a start button 42 and a display screen 44. The start button 42 makes it possible to send the command 38 intended for the restraint means. In this embodiment, the man-machine interface 40 comprises a payment device allowing payment in order to unlock the plate, shown in the figure by a payment slot 46 of the coin machine type and a slot 48 for a payment card. The sending of the command 38 may be triggered directly by the payment, or by pressing on the start button 42 once said payment has been made.

In this embodiment, the control device 36 also comprises a timing means, making it possible to control the period during which the command 38 is sent to the rotary plate 10. This timing may be fixed or may depend on the payment made via the payment device 36. The duration of the timing at the start and the remaining time of the timing are displayed on the display screen 44 of the control device 36. At the end of the timing, the restraint means are driven into the restrained state.

In this embodiment, the command 38 is sent by means of an electrical signal generated by a component of the control device 36, such as a microcontroller. The microcontroller also manages the other elements of the control device 36, such as the buttons, the payment device, the screen 44 and the timing means. The microcontroller may be replaced by any element known to a person skilled in the art according to the required functionalities, such as an electronic circuit, a programmable logic circuit, a computer, etc.

For safety reasons, the man-machine interface 40 generally comprises an emergency stop button 50 making it possible to drive the restraint means into the restrained state in order to prevent the free rotation of the rotary plate 10, for example in the case of potential danger for a user.

FIG. 2 is a schematic view of the rotary plate 10 controlled by the control mechanism 20, shown in a cross section through its diameter. The rotary plate 10 is arranged on the frame 12 by means of a mechanical connection (not shown) that allows rotation of the rotary plate 10.

The restraint means of the control mechanism 20 are shown in this figure in a restrained state, that is to say the restraint means provide a rotational restraint of the rotary plate 10. The braking means 22 are deployed, and the locking means 24 prevent rotation of the rotary plate 10. More particularly, the braking wheels 28 of the braking means 22 are in contact with the ring 16 of the rotary plate 10.

In this embodiment of the invention, the rod 32 of the locking means 24 is shown in the deployed position, that is to say inserted in the opening 34 provided in the rotary plate 10 and passing through one of the braking wheels 28. This makes it possible to lock the rotary plate 10 more securely and to lock the braking means 22 in the deployed position.

So as best to optimise the changes between free rotation of the rotary plate 10 and rotational restraint of the rotary plate 10, a use of the control mechanism 20 according to an embodiment of the invention is as follows:

the rotary plate 10 is released by means of the command 38 being sent by the control device 36. This release results in the braking means 22 being moved into the retracted position and the plate 10 being unlocked by the rod 32 which is withdrawn from the opening 34 provided in the rotary plate 10;

the timing is triggered, preferably by the sending of the command 38;

at the end of the timing period, the braking means 22 move into the deployed position, preferably gradually in order to afford gradual slowing of the rotary plate 10, until the rotary plate 10 is completely stopped;

once the plate 10 has been stopped, the rod 32 is inserted in the opening 34 provided in the rotary plate 10 in order to lock the rotation of the rotary plate 10. The plate 10 can no longer be rotated.

FIG. 3 is a detailed view of a cross section of the rotary plate 10 controlled by a control mechanism 20 according to an embodiment of the invention.

The rotary plate 10, surrounded by the ring 16, is connected to the frame 12 by a mechanical connection 52 comprising a circular top part 54 that is fixed to the plate 10 and forms a pivot connection to a circular bottom part 56 that is fixed to the frame 12. The braking means 22, fixed to the frame 12, comprise the two jack cylinders 30, at the ends of which the braking wheels 28 are located, here in the deployed position, which wheels are therefore in contact with the ring 16 of the rotary plate 10. In this case, the locking means 24 are formed by a rod 58 that locks the plate 10 by means of an electromagnet 60 that comes into contact with a circular magnetic strip 62 fixed to the bottom of the rotary plate 10. In another embodiment of the invention, the locking means 24 may comprise a plurality of these rods comprising electromagnets, arranged so as to come into contact with the magnetic strip 62 at a plurality of points thereon.

The frame 12 is in contact with the ground 14 via means 18 for holding on the ground comprising fixed metal feet 64, as well as metal feet 66 on jacks that are adjustable so to adapt the holding according to the surface of the ground 14.

FIG. 4 shows a carousel 68 according to an embodiment of the invention. The carousel 68 is supported by a rotary plate 10 as described previously. The carousel 68 is formed by a circular floor 70, and a vertical mast 72 extending from the centre of the floor 70 towards the centre of a circular canopy 74 overhanging the floor 70. The floor 70 and the canopy 74 are also connected on their peripheries by fixing bars 76. The fixing bars 76 improve the stability of the canopy 74, and also function as grips allowing a user located outside the carousel 68 to manually rotate said carousel. To facilitate the rotation, the fixing bars may for example comprise handles.

Depending on the embodiments, the floor 70 may be fixed to the rotary plate 10 according to the invention, or the rotary plate 10 may itself serve as the floor 70 for the carousel 68.

The invention claimed is:

1. A carousel supported by a rotary plate, controlled by a control mechanism comprising:
    means for restraining said rotary plate, said restraining means being controlled in two states, a restrained state and a released state, said restraining means being suitable for providing, in said restrained state, a rotational restraint of said rotary plate, and for allowing, in said released state, a free rotation of said rotary plate,
    a device controlling said restraint means that drives, on command, said restraint means into said released state, said restraint means being in the restrained state by default, and
    a timing means having a predefined duration, and in that the control device is suitable for driving the restraint means into said released state during the timing period.

2. The carousel according to claim 1, wherein said means for restraining the rotary plate comprises means for braking the rotation of the rotary plate.

3. The carousel according to claim 1, wherein said rotary plate is a circular rotary plate surrounded by a ring that is rigidly connected to and projects from said plate, wherein said braking means comprises a device moving braking wheels between a deployed position in which the wheels press on the ring so as to prevent free rotation of the plate, and a retracted position in which the wheels are separated from the ring so as not to restrain the free rotation of the plate.

4. The carousel according to claim 1, wherein said means for restraining the rotary plate comprise means for locking the rotary plate in rotation.

5. The carousel according to claim 4, wherein the locking means comprise a rod that extends in a direction perpendicular to the plate and is suitable for being inserted in an opening that is shaped to the rod and is provided on the rotary plate so as to lock the rotation of said rotary plate when the mechanism is in the restrained state.

6. The carousel according to claim 1, wherein the control device comprises a man-machine interface suitable for triggering a command for said restraint means in said released state.

7. The carousel according to claim 6, wherein the man-machine interface comprises a payment device, said payment device triggering said command.

8. A merry-go-round comprising a carousel, a rotary plate and a control mechanism comprising:
    means for restraining said rotary plate, said restraining means being controlled in two states, a restrained state and a released state, said restraining means being suitable for providing, in said restrained state, a rotational restraint of said rotary plate, and for allowing, in said released state, a free rotation of said rotary plate,
    a device controlling said restraint means that drives, on command, said restraint means into said released state, said restraint means being in the restrained state by default, and
    a timing means having a predefined duration, and in that the control device is suitable for driving the restraint means into said released state during the timing period.

9. A method for controlling a rotary plate supporting a carousel, the method comprising:
    restraining a free rotation of the rotary plate with a restraint means comprising two states—a restrained state and a released state,
    controlling a release of the restrained rotary plate into the released state, during which the rotary plate rotates freely,
    triggering a timing period during which the rotary plate is released by commanding the restraint means into the released state,
    at the end of the timing period, braking rotation of said rotary plate until rotation of said plate stops, and,
    when the rotation of said plate stops, locking said plate from rotation.

* * * * *